(12) United States Patent
Hartog et al.

(10) Patent No.: US 8,408,064 B2
(45) Date of Patent: Apr. 2, 2013

(54) DISTRIBUTED ACOUSTIC WAVE DETECTION

(75) Inventors: Arthur H. Hartog, Winchester (GB); Douglas Miller, Boston, MA (US); Kamal Kader, Akasaka (JP); Gareth P. Lees, Southampton (GB); Graeme Hilton, Southampton (GB); Stephen Mullens, Welwyn Garden (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 612 days.

(21) Appl. No.: 12/611,952

(22) Filed: Nov. 4, 2009

(65) Prior Publication Data
US 2010/0107754 A1 May 6, 2010

Related U.S. Application Data

(60) Provisional application No. 61/111,916, filed on Nov. 6, 2008.

(51) Int. Cl.
*G01N 29/24* (2006.01)
*G01N 29/44* (2006.01)

(52) U.S. Cl. .......................................... 73/643
(58) Field of Classification Search ............. 73/643, 73/152.16, 152.47, 152.58
See application file for complete search history.

(56) References Cited

U.S. PATENT DOCUMENTS

| | | | |
|---|---|---|---|
| 602,422 A * | 4/1898 | Batcheller | 181/123 |
| 4,524,436 A | 6/1985 | Hall et al. | |
| 4,737,106 A | 4/1988 | Laciny | |
| 4,805,726 A | 2/1989 | Taylor et al. | |
| 5,194,847 A | 3/1993 | Taylor et al. | |
| 6,246,048 B1 | 6/2001 | Ramos et al. | |
| RE37,283 E | 7/2001 | Kluth et al. | |
| 6,268,911 B1 | 7/2001 | Tubel et al. | |
| 6,496,261 B1 | 12/2002 | Wilsher et al. | |
| 6,510,104 B1 | 1/2003 | Ikegami | |
| 6,555,807 B2 | 4/2003 | Clayton et al. | |
| 6,722,437 B2 | 4/2004 | Vercaemer et al. | |
| 6,725,924 B2 | 4/2004 | Davidson et al. | |
| 6,758,272 B2 | 7/2004 | Bixenman et al. | |
| 6,772,836 B2 | 8/2004 | Schetky et al. | |
| 6,837,310 B2 | 1/2005 | Martin | |

(Continued)

FOREIGN PATENT DOCUMENTS

| GB | 2126820 A | 3/1984 |
|---|---|---|
| GB | 2222247 A | 2/1990 |

(Continued)

OTHER PUBLICATIONS

Bakulin et al., "Real-time completion monitoring with acoustic waves", online Dec. 26, 2007, Geophysics, vol. 73, No. 1.*

(Continued)

*Primary Examiner* — Peter Macchiarolo
*Assistant Examiner* — Rose M Miller
(74) *Attorney, Agent, or Firm* — Brandon S. Clark; Rodney Warfford

(57) ABSTRACT

A distributed acoustic wave detection system and method is provided. The system may include a fiber optic cable deployed in a well and configured to react to pressure changes resulting from a propagating acoustic wave and an optical source configured to launch interrogating pulses into the fiber optic cable. In addition, the system may include a receiver configured to detect coherent Rayleigh noise produced in response to the interrogating pulses. The CRN signal may be use to track the propagation of the acoustic wave in the well.

21 Claims, 3 Drawing Sheets

U.S. PATENT DOCUMENTS

| | | | |
|---|---|---|---|
| 6,874,361 | B1 | 4/2005 | Meltz et al. |
| 6,913,079 | B2 | 7/2005 | Tubel |
| 6,939,717 | B2 | 9/2005 | Jiang et al. |
| 7,147,060 | B2 | 12/2006 | Huber et al. |
| 7,187,620 | B2 | 3/2007 | Nutt et al. |
| 7,243,715 | B2 | 7/2007 | Wang et al. |
| 7,261,162 | B2 | 8/2007 | Deans et al. |
| 7,301,474 | B2 | 11/2007 | Zimmerman |
| 7,304,725 | B2 | 12/2007 | Hartog et al. |
| 7,308,941 | B2 | 12/2007 | Rolovic et al. |
| 7,357,021 | B2 * | 4/2008 | Blacklaw .................. 73/152.31 |
| 7,420,475 | B2 | 9/2008 | Adnan et al. |
| 7,451,812 | B2 | 11/2008 | Cooper |
| 7,597,142 | B2 | 10/2009 | Hartog et al. |
| 7,668,411 | B2 | 2/2010 | Hartog et al. |
| 2003/0033866 | A1 | 2/2003 | Diakonov et al. |
| 2003/0094281 | A1 | 5/2003 | Tubel |
| 2006/0207764 | A1 | 9/2006 | Rytlewski |
| 2007/0227727 | A1 | 10/2007 | Patel et al. |
| 2007/0252717 | A1 | 11/2007 | Fielder |
| 2007/0263488 | A1 | 11/2007 | Clark |
| 2008/0030714 | A1 | 2/2008 | Hall et al. |
| 2008/0042869 | A1 | 2/2008 | Zimmerman |
| 2008/0217022 | A1 | 9/2008 | Deans |
| 2008/0297772 | A1 | 12/2008 | Rogers et al. |
| 2009/0006005 | A1 | 1/2009 | Segal et al. |
| 2009/0008078 | A1 | 1/2009 | Patel |
| 2009/0037111 | A1 | 2/2009 | Radtke et al. |
| 2009/0114386 | A1 * | 5/2009 | Hartog et al. ............. 166/250.08 |
| 2009/0132183 | A1 | 5/2009 | Hartog et al. |
| 2009/0182509 | A1 | 7/2009 | Kimminau et al. |
| 2009/0242197 | A1 | 10/2009 | Hackworth et al. |

FOREIGN PATENT DOCUMENTS

| | | |
|---|---|---|
| GB | 2381281 A | 4/2003 |
| GB | 2416398 A | 1/2006 |
| GB | 2432378 A | 5/2007 |
| GB | 2440351 A | 1/2008 |
| GB | 2447691 A | 9/2008 |
| GB | 2456300 A | 7/2009 |
| GB | 2457278 A | 8/2009 |

OTHER PUBLICATIONS

Biot, M.A., Propagation of Elastic Waves in a Cylindrical Bore Containing a Fluid. Journal of Applied Physics, 1952. 23(9): p. 997-1003.

Winbow, G.A., Seismic Sources in Open and Cased Boreholes. Geophysics, 1991. 56(7): p. 1040-1050.

Liu, H.L. and D.L. Johnson, Effects of an Elastic Membrane on Tube Waves in Permeable Formations. The Journal of the Acoustical Society of America, 1997. 101(6): p. 3322-3329.

Norris, A.N., Stoneley-wave Attenuation and Dispersion in Permeable Formations. Geophysics, 1989. 54(3): p. 330-341.

Schoenberg, M., P.N. Sen, and J.E. White, Attenuation of Acoustic Modes Due to Viscous Drag at the Borehole Wall. Geophysics, 1987. 52(11): p. 1566-1569.

Strong, A.P., et al., A Comprehensive Distributed Pipeline Condition Monitoring System and its Field Trial., In International Pipeline Conference, Sep. 26-Oct. 3, 2008. Calgary, Alberta, Canada. p. IPC2008-64549.

Healey, P., Statistics of Rayleigh Backscatter From a Single-Mode Fiber. Communications, IEEE Transactions on [legacy, pre-1988], 1987. 35(2): p. 210-214.

Juarez, J.C., et al., Distributed Fiber-Optic Intrusion Sensor System. Journal of Lightwave Technology, 2005. 23(6): p. 2081-2087.

Juarez, J.C. and H.F. Taylor, Polarization Discrimination in a Phase-Sensitive Optical Time-Domain Reflectometer Intrusion-Sensor System. Optics Letters, 2005. 30(24): p. 3284-3286.

Juarez, J.C. and H.F. Taylor, Field Test of a Distributed Fiber-Optic Intrusion Sensor System for Long Perimeters. Applied Optics, 2007. 46(11): p. 1968-1971.

Juskaitis, R., et al., Interferometry with Rayleigh Backscattering in a Single-Mode Optical Fiber. Optics Letters, 1994. 19(3): p. 225.

Juskaitis, R., et al., Distributed Interferometric Fiber Sensor System. Optics Letters, 1992. 17(22): p. 1623-1625.

Posey, R.J., G.A. Johnson, and S.T. Vohra, Rayleigh Scattering Based Distributed Sensing System for Structural Monitoring. In 14th Conference on Optical Fibre Sensors. 2001. Venice, Italy.

Posey, R.J., G.A. Johnson, and S.T. Vohra, Strain Sensing Based on Coherent Rayleigh Scattering in an Optical Fibre. Electronics Letters, 2000. 36(20): p. 1688-1689.

Mermelstein, M.D., et al., Rayleigh Scattering Optical Frequency Correlation in a Single-Mode Optical Fiber. Optics Letters, 2001. 26(2): p. 58-60.

Bakulin, A., et al., Acoustic Surveillance of Production Impairment with Real-Time Completion Monitoring, in SPE International Symposium and Exhibition on Formation Damage Control. 2008: Lafayette, Louisiana, U.S.A.

Barnoski, M.K. and S.M. Jensen, Fiber Waveguides: A Novel Technique for Investigating Attenuation Characteristics. Applied Optics, 1976. 15(9): p. 2112-2115.

Mickelson, A.R. and M. Eriksrud, Theory of the Backscattering Process in Multimode Optical Fibers. Applied Optics, 1982. 21(11): p. 1898-1909.

Hill, K.O., Photosensitivity in Optical Fiber Waveguides: From Discovery to Commercialization. Selected Topics in Quantum Electronics, IEEE Journal of 2000. 6(6): p. 1186-1189.

Kirkendall, C.K. and A. Dandridge, Overview of High Performance Fibre-Optic Sensing. Journal of Physics D: Applied Physics, 2004. 37: p. R197-R216.

Nash, P., Review of Interferometric Optical Fibre Hydrophone Technology, IEEE Proceedings on Radar, Sonar, and Navigation, 1996. 143(3): p. 204-209.

Miller, D. and R. Coates, Implosive Borehole Acoustics. 2006.

Hughes, R. and J. Jarzynski, Static Pressure Sensitivity Amplification in Interferometric Fiber-Optic Hydrophones. Applied Optics, 1980. 19(1): p. 98-107.

* cited by examiner

DISTRIBUTED ACOUSTIC WAVE DETECTION

This application claims the benefit of U.S. Provisional Application Ser. No. 61/111,916, entitled, "DISTRIBUTED ACOUSTIC WAVE DETECTION," filed on Nov. 6, 2008, which is incorporated herein by reference in its entirety.

TECHNICAL FIELD

The present invention relates generally to the detection of acoustic waves in downhole applications, and more particularly to fiber optic detection of acoustic waves.

BACKGROUND

The propagation of guided acoustic waves, such as Stoneley waves and pressure waves in structures, such as pipes or other conduits, is known. In the field of hydrocarbon production, guided acoustic waves have been used for acoustic logging. In accordance with one implementation of acoustic logging, an acoustic tool having an acoustic source and one or more acoustic receivers (e.g., hydrophones) is lowered into the borehole. At each depth, the source emits acoustic waves, usually over a range of carrier frequencies. The time of arrival of these waves at the receivers is interpreted to provide information about the formation surrounding the borehole. This may be accomplished, for example, by examining the propagation velocity of the acoustic waves and the manner in which that velocity varies with the carrier frequency. The attenuation of the acoustic waves may also be considered, again as a function of frequency. While this technique may provide a host of information regarding the formation, it is an intrusive and extremely time consuming technique.

Another type of measurement that has been conducted with guided acoustic waves in the field of hydrocarbon production involves launching pressure pulses from the surface into the wellbore and observing the time-dependence of the returned acoustic energy. While this technique can provide information about average acoustic velocity or the location of obstructions in the well (e.g., the position of a cement plug or the state of a valve), it requires prior knowledge regarding the properties of the fluid in the well and/or calibration of the wave velocity for the conversion of reflection time to distance along the wellbore.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Figure 1:
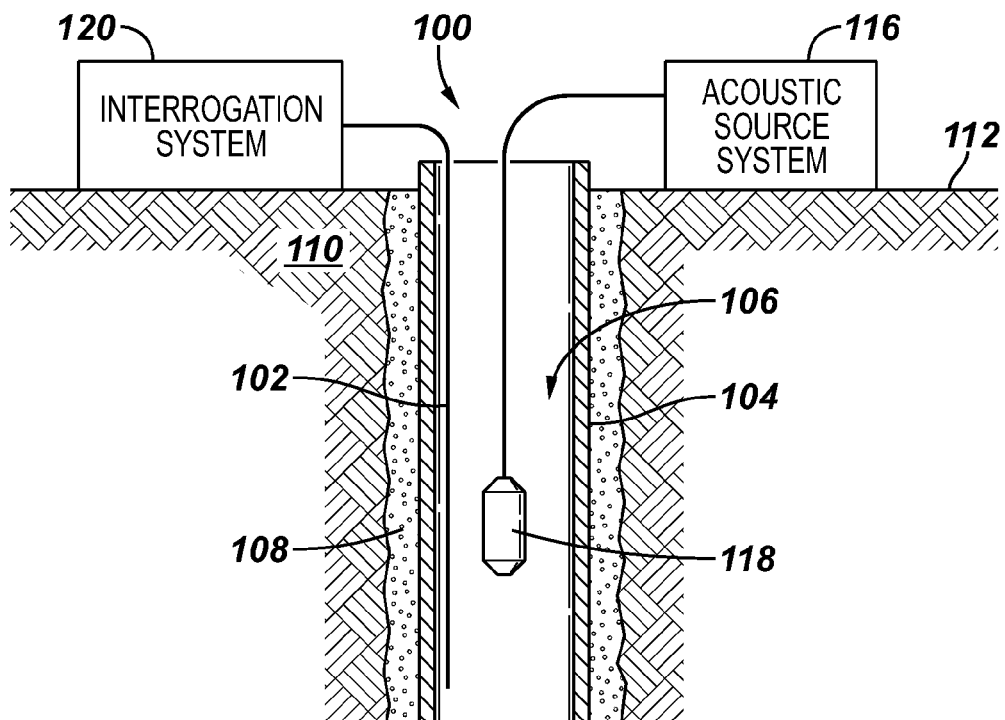
FIG. 1 is a schematic illustration of an exemplary distributed acoustic wave detection system employed in a cased wellbore, where the sensing cable is placed within the borehole, according to an embodiment of the present invention.

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via another element"; and the term "set" is used to mean "one element" or "more than one element". As used herein, the terms "up" and "down", "upper" and "lower", "upwardly" and downwardly", "upstream" and "downstream"; "above" and "below"; and other like terms indicating relative positions above or below a given point or element are used in this description to more clearly describe some embodiments of the invention.

In an embodiment of the invention, acoustic events along an elongate structure may be directly tracked through the use of a distributed sensor that detects a guided acoustic wave propagating along the structure. By using a distributed sensor, the velocity of the acoustic waves can be directly measured as a function of position along the elongate structure and elapsed time. This type of detection allows characteristics of the fluid in the structure and characteristics of the medium surrounding the structure to be determined. When the structure is a conduit (such as a pipe) that contains a fluid, the speed of an acoustic wave propagating along the structure is dependent on both the acoustic velocity of the fluid contained in the structure and the flow velocity of the fluid itself. Thus, by understanding the speed of propagation of acoustic events, information regarding the properties and the flow rate of the fluid may be derived, as well as information about the conduit itself. Yet further, in hydrocarbon well applications, the attenuation of the acoustic wave as a function of frequency, and the dispersion of the waves, is known to be affected by the properties of the formation surrounding the wellbore. Thus, information about the formation itself may also be derived from acoustic waves.

For example, for a guided acoustic wave propagating along an elongate structure, the time of arrival of the wave at each position along the structure can provide a direct measure of the group velocity of the wave. In addition, where the acoustic wave is narrow-band, the acoustic wavelength is a direct measure of phase velocity. Yet further, the group velocity dispersion may be measured, for example, by launching successive narrow-band acoustic pulses of varying central (carrier) frequency and observing the variation of transit time as a function of carrier frequency. At those frequencies where the acoustic wave is influenced by the properties of the formation outside the borehole, the attenuation of the wave is related to the viscosity of the fluid permeating the rock.

Accordingly, embodiments of the invention may comprise a method for monitoring properties of an elongate structure, properties of the fluid in that structure, the velocity of the fluid in the structure, and/or the properties of the medium surrounding the structure by placing at least a distributed acoustic sensor along a length of the structure, creating one or more guided acoustic wave events (e.g. pressure pulses), tracking the progress of these waves along the structure using at least the distributed acoustic sensor information, and determining from the latter, information on the fluid (such as its composition and/or velocity) and the structure itself (such as changes in diameter, roughness etc.) and/or information on the acoustic properties of the medium surrounding the structure. In some embodiments of the invention, the distributed acoustic sensor is a fiber optic cable and may be either a single-mode fiber or a multi-mode fiber depending on the particular application in which the distributed acoustic sensor is employed.

As previously noted, embodiments of the invention may be directed to elongate structures containing a fluid that one is interested in monitoring. Examples of such structures include, but are not limited to, wells for production of hydrocarbons, injection wells for improving hydrocarbon recovery, geothermal wells for energy extraction or storage, $CO_2$ sequestration, pipelines and flowlines, sewers, water/gas mains and also more complex structures, such as umbilicals containing fluid-filled pipes or oil-insulated or gas-insulated electrical power transmission lines, and superconducting cables containing cryogenic coolant fluids. Embodiments of the invention may also be applicable to the monitoring of acoustic waves in solid structures.

In embodiments of the invention that are employed in the hydrocarbon production environment, the elongate structure may be a wellbore, which may be viewed as an acoustic waveguide along which acoustic waves propagate, and the distributed acoustic sensor may be placed in the wellbore. The wellbore may be cased and, if the well is completed, may include production tubing. In such embodiments, the distributed sensor may be placed inside the wellbore or the production tubing, for example using an intervention conveyance (e.g. slickline, wireline, coil tubing, among others) or a more permanent means, such as stinger tube lowered into the wellbore or tubing. In completed wells, the distributed sensor may be positioned proximate the production tubing, either in the interior of the tubing or proximate or coupled to the exterior surface of the tubing. Depending on the application, the contents of the wellbore (or production tubing) could be a fluid, but could also be (or become) solid (e.g. a cement curing or a wax solidifying in the wellbore).

Figure 2:
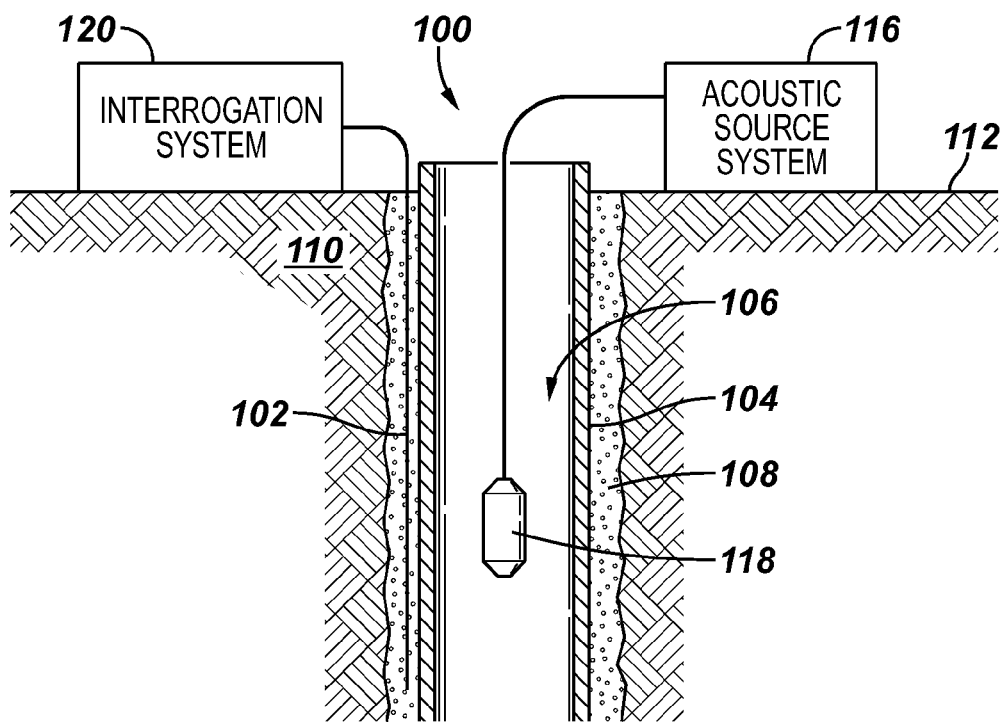
FIG. 2 is a schematic illustration of an exemplary distributed acoustic wave detection system employed in a cased wellbore with a sensing cable cemented behind the casing, according to an embodiment of the present invention.

In one illustrative embodiment, a distributed acoustic sensor may be coupled acoustically to an elongate structure, either inside the structure or attached to the outside of the structure, or in some cases, disposed some distance away from the structure. In hydrocarbon production applications, the elongate structure may be a wellbore, a cased wellbore and/or a production tubing in a completed well. For example, FIG. 1 illustrates a well 100 in which a distributed sensor 102 is deployed within a wellbore 106, which, in this instance, includes a casing 104. The wellbore 106 extends from a surface 112 into a surrounding formation 110. In this example, the sensor 102 may be deployed within the wellbore 106 using known methods for conveying cables into wellbores, such as slickline containing an optical fiber, or coil tubing containing an optical fiber, or a wireline cable with integrated optical fibers, or coil tubing in which an optical fiber is pumped into location within the coil tubing, among other methods. Alternatively, in FIG. 2, the distributed sensor 102 is deployed behind the casing 104 of the wellbore 106. The distributed sensor 102 in this example may be deployed with (and possibly attached to) the casing 104 as it is lowered into the wellbore 106. The casing 104 may be cemented in place when the gap between the borehole 106 and the casing 104 is filled with cement 108.

Figure 3:
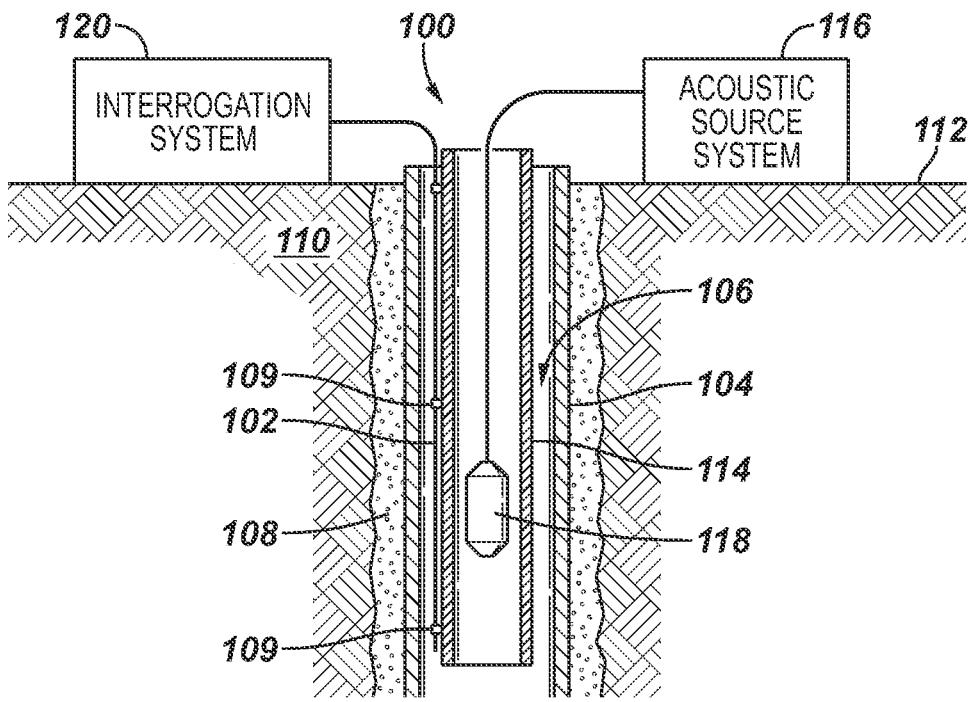
FIG. 3 is a schematic illustration of an exemplary distributed acoustic wave detection system employed in a cased wellbore, where the sensing cable has been attached to the production tubing, according to an embodiment of the present invention.

Another method for acoustically coupling the distributed sensor 102 to an elongate structure may comprise attaching the sensor 102 to the outside of a production tubing 114, such as illustrated in FIG. 3. Alternatively, a hydraulic control line (e.g., typically ¼" OD stainless steel or other corrosion-resistant alloy, among others) may be coupled to the outside of the production tubing 114 and the distributed sensor 102 may be deployed within the control line.

Figure 4:
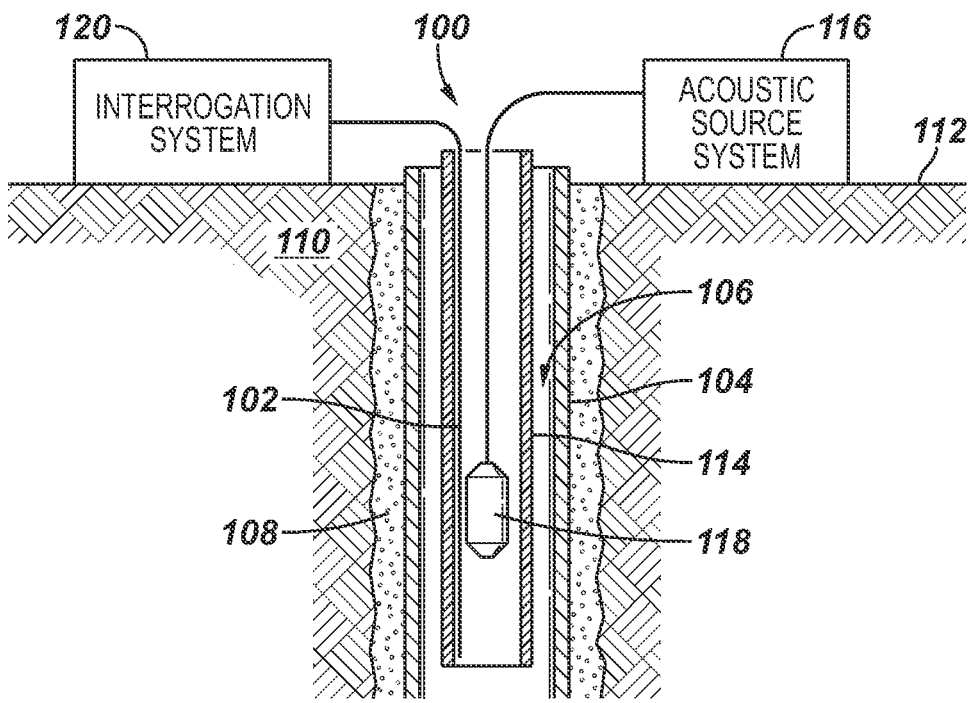
FIG. 4 is a schematic illustration of an exemplary distributed acoustic wave detection system employed in a well in which a sensing cable has been placed within the production tubing, according to an embodiment of the present invention.

In embodiments in which the wellbore 106 is cased with casing 104 and completed with a production tubing 114, and as illustrated in FIG. 4, intervention-type deployment methods may be employed to deploy the distributed sensor 102 within the production tubing 114.

In any of these embodiments, an acoustic source system 116 may generate the guided acoustic waves by, for instance, lowering a device 118 on a conveyance (e.g. slickline, coil tubing, or wireline, among others) into the wellbore 104 or production tubing 114. The acoustic source system 116 and device 118 may be configured to generate acoustic waves of a predetermined kind. For instance, the acoustic wave may be a broad band pulse, such as may be produced by abruptly opening an empty cavity to the wellbore (possibly by an implosion, or an evacuated cavity). Alternatively, the acoustic wave may be a specific acoustic waveform emitted by a sonic transducer. As another example, in a hydrocarbon production application, the acoustic source may be a downhole measurement while drilling (MWD) tool that is incorporated into a drill string and which causes pressure changes in the drilling mud used during drilling operations. Any acoustic source that provides a suitable acoustic signal for the particular application may be used and embodiments of the invention should not be limited to the illustrative examples described herein.

As previously discussed, the distributed acoustic sensor element 102 may be an optical fiber, generally encased in a protective layer. In some embodiments, the optical fiber may be loosely disposed within a control line strapped to the outside of the production tubing 114 to detect the acoustic wave propagating along the production tubing 114. In other embodiments, a stronger detection signal may be obtained by tightly coupling the optical fiber 102 to the tubing 114, for example by placing it within a tight jacket and within a solid (i.e. with negligible gaps) cable. In such embodiments, the cable may be filled with an acoustic-matching medium, e.g., a gel, and strapped at sufficiently frequent intervals to the production tubing 114. Alternatively, the cable may be attached to the production tubing 114 with some form of adhesive or adhesive tape to ensure a reliable contact between the cable and tubing 114. In some embodiments, the cable may have a compliant coating to enhance the transmission of pressure waves to the optical fiber.

In certain well completions, it may be advantageous to place the optical cable 102 behind the well casing 104, where the optical cable 102 can be cemented in place to ensure a good acoustic contact with both the casing 106 and the formation 110.

In exemplary embodiments, the distributed acoustic sensor 102 may be an optical fiber. In such embodiments, monitoring of the guided acoustic waves may be based on coherent Rayleigh backscatter in which a pulse of coherent light is launched into a fiber and returned light is analyzed. For incoherent illumination, the returned light as a function of elapsed time since the launching of the probe pulse takes the form of a generally decaying waveform, the rate of decay being indicative of the loss in the optical fiber, with occasionally small features due to imperfections of the fiber, such as diameter variations or axial changes in the refractive index. However, with coherent illumination, the backscatter waveform is additionally modulated by a multi-path interference that occurs between the light re-radiated by each scattering element. This modulation of the normally slow backscatter signal is random (i.e., it depends on the relationship between the optical source frequency and the spatial distribution of the scatterers in each elemental section of fiber), but stable. If the fiber is disturbed by an acoustic wave, for example, the modulation of the backscattered signal is varied in the vicinity of the disturbance. Such variations of the backscattered signal may be analyzed to detect events of a specified level and classified to determine the nature of the disturbance. The coherent Rayleigh backscatter is sometimes referred to as "coherent Rayleigh noise" (CRN).

In some embodiments, rather than employ a fully distributed sensing fiber, an array of discrete reflectors 109 instead may be inserted into the fiber 102. For instance, in one embodiment, the reflectors 109 may be fiber Bragg reflectors inscribed by side-illumination with a UV interference pattern. The fiber section between each reflector then becomes a low reflectivity Fabry-Perot étalon and the fiber then comprises an array of such etalons, forming an interferometric sensor array that can be interrogated with a variety of methods known in the field of optical fiber sensing. While the array approach is more costly than the fully distributed one, the stronger reflectivity of the discrete reflectors 109, as compared for the Rayleigh backscatter, improves the signal-to-noise ratio and thus allows weaker acoustic signals to be detected. Therefore, which of these techniques is employed will depend on the particular application in which it is implemented and specifically on the anticipated acoustic signal strength as measured at the sensing optical fiber 102. Although, the terminology "distributed acoustic sensor" is used throughout this description, it is understood to also include arrays of fiber-optic acoustic sensors.

The use of a distributed acoustic sensor 102 to monitor guided acoustic waves may be particularly advantageous in hydrocarbon production. Specifically, by acoustically coupling a distributed acoustic sensor 102 to the wellbore, wellbore casing, and/or production tubing and causing guided acoustic waves to be propagated along that structure, the velocity of these waves can be directly measured as a function of location along the structure and elapsed time. This allows a number of properties of the fluid in the well 100 and the surrounding formation 110 to be better determined. In addition, a distributed sensor 102 may be relatively well-suited for time-lapse monitoring of change in impedance profile due to movement of an entrained object or a change in fluid properties.

For example, the time of arrival at each location along the structure 124 (see FIG. 5) provides a direct measure of the group velocity of the acoustic wave. In addition, where the wave is narrow-band, the acoustic wavelength is a direct measure of the phase velocity. Furthermore, the group velocity dispersion may be measured, for example, by launching successive narrow-band pulses of varying central (carrier) frequency and observing the variation of transit time as a function of carrier frequency. At those frequencies where the wave is influenced by the properties of the formation outside the wellbore, the attenuation of the wave is related to the viscosity of the fluid permeating the rock.

Figure 5:
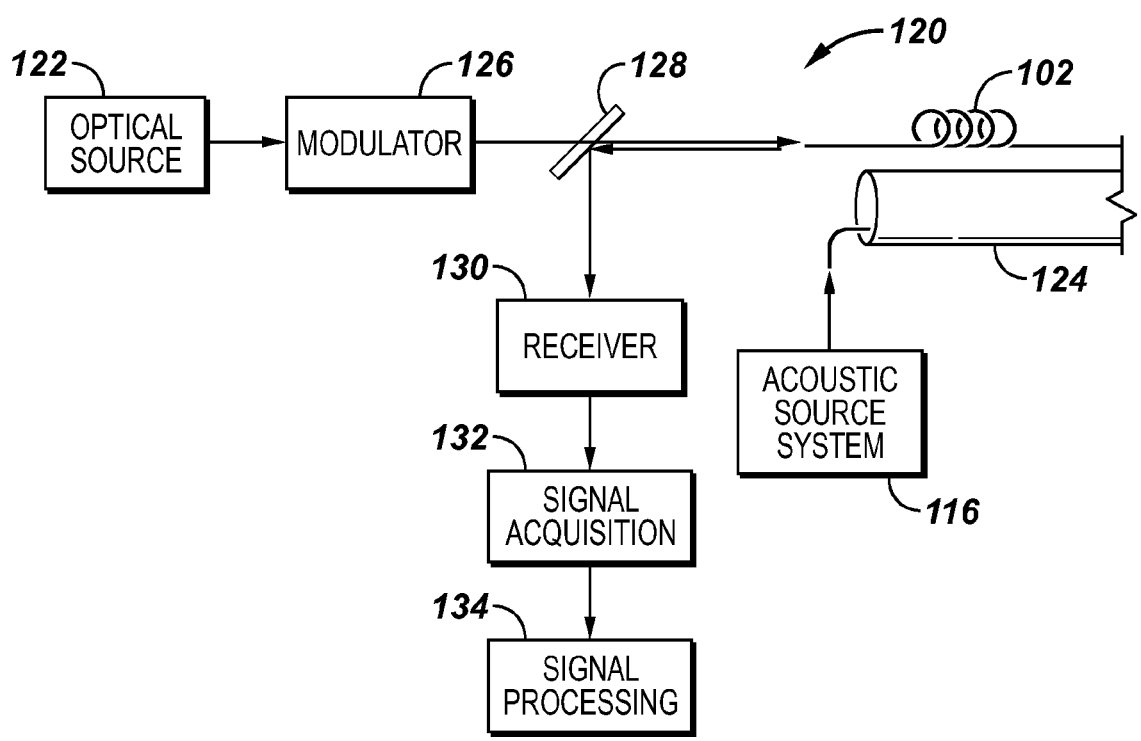
FIG. 5 is a schematic illustration of an exemplary distributed acoustic detection system according to an embodiment of the present invention.

In some embodiments, the interrogation of the acoustic sensing fiber 102 may be conducted from a convenient location, such as at the surface 112, for terrestrial applications, in a control room using an interrogation system 120 (see FIGS. 1-4). FIG. 5 illustrates an exemplary embodiment of an interrogation system 120 that may be used with the optical fiber 102 for the CRN measurement. System 120 includes an optical source 122 that generates an optical signal, such as an optical pulse, for interrogating the fiber optic sensor 102, which is acoustically coupled to an elongate structure 124. In some embodiments, the optical source 122 may comprise a narrowband laser (e.g., a fiber distributed feedback laser) followed by a modulator 126 that selects short pulses from the output of the laser. Optionally, an optical amplifier may be used to boost the peak power of the pulses. In some embodiments, this amplifier may be placed after the modulator 126. The amplifier may also be followed by a filter for filtering in the frequency domain (by means of a band-pass filter) and/or in the time domain (by means of a further modulator).

The pulses emitted from the optical source 122 may be launched into the optical fiber 102 through a directional coupler 128, which separates outgoing and returning signals and directs the latter to an optical receiver 130. The directional coupler 128 may be in bulk optic form (as illustrated) using a beamsplitter, or it may comprise a fiber-optic coupler, a circulator, or a fast switch (e.g. an electro-optic or acousto-optic switch).

The backscattered optical signal returned from the sensing fiber 102 in response to the interrogating pulses may be detected and converted to an electrical signal at the receiver 130. This electrical signal may be acquired by a signal acquisition module 132 (e.g., an analog to digital converter) and then transferred to a signal processing module 134 (e.g., a microprocessor, microcontroller, digital signal processor, computer, etc.). In some embodiments, the signal processing module 134 analyzes the waveforms received to determine, at each location along the fiber 102, where the signal is changing. In addition, the signal processing module 134 may interpret this change in terms of acoustic waves modulating the backscatter return of the fiber 102.

More specifically, the backscatter signal (including the CRN) produced in response to the interrogating pulses is directed to the optical receiver 130. At any given time T (i.e., corresponding to a particular distance along the fiber 102) the electric field arriving at the receiver 130 is the vector sum of all the electric fields generated by all the scatterers within the length of fiber 102 that was occupied by the launched pulse at time T/2. The relative phase of these scatterers, dependent on the laser wavelength and distribution of the scatterers, determines whether the signals from these scatterers sum to a large absolute value (constructive interference) or essentially cancel each other out (destructive interference).

In an exemplary embodiment, the receiver 130 includes a detector that responds to optical power (as opposed to an electric field) and thus has a square-law response in terms of electric field. Thus, as the fiber 102 is disturbed by the passing acoustic waves, the optical fiber 102 is strained by these waves if they couple to the fiber 102. A strain on the fiber 102 changes the relative position between the scattering centers by simple elongation of the fiber 102. The strain also changes the refractive index of the glass of the fiber 102. Both of these effects alter the relative phase of the light scattered from each scattering center. As a result, the interference signal in the disturbed region is varied by modulation of the length of the optical fiber 102, since an interference signal that may have been constructive (i.e., the scattering from each center was roughly in-phase, their electric fields sum to a large value) is now destructive (i.e., the relative phase of the scattered signals from each reflector sum to a small electric field amplitude).

The foregoing description of the detection of the CRN signals illustrates one embodiment in which the light from a single pulse undergoes direct detection. Other embodiments may launch optical pulses at two frequencies, the scatter from which mix at the square-law detector in receiver 130 to yield a signal at a beat frequency. In yet other implementations, the backscatter may be passed through a compensating interferometer, which causes backscattered light to interfere with the backscatter from another section of fiber separated from the original backscattered light by a distance equal to half the path imbalance of the compensating interferometer. A further variant is the use of coherent detection where the backscatter signal is mixed with a sample of the narrowband optical source, usually referred to as the "local oscillator." This coherent detection technique provides a low-noise method of detecting the signal since the signal reaching the detector is the product of the electric fields of the local oscillator and backscatter signals and the former may be selected to be sufficiently strong so that the resulting mixed signal dominates the noise at the receiver input.

Regardless of the particular technique implemented, the electrical signals emerging from the receiver 130 may be processed to detect the passage of the acoustic wave and possibly to determine the relative time of the acoustic wave's passage at different locations along the structure 124, and possibly the acoustic wave's spectral content. One way to achieve these results is to pass the signal to an analog-to-digital converter in the signal acquisition unit 132 and thereby digitize the receiver output for each probe pulse and with sufficient time resolution to be able to track the acoustic wave. Signals from a set of probe pulses, but all corresponding to a single location along the structure 124, may be combined into a single waveform that can be analyzed for spectral content, for example by means of a Fourier transform. The time of arrival of the acoustic signal may be determined by a number of estimation techniques, for example by determining the first moment of a signal corresponding to the deviation of the signal from its quasi-static mean value. The phase velocity may be determined by comparing the time of pre-determined parts (for example the zero-crossing time) of the acoustic waveform at successive locations along the structure 124, or by extracting a phase estimate from the Fourier transform and determining the partial derivative of phase versus the position along the structure. The attenuation of various frequency components may be determined, for example, by comparing acoustic spectra obtained at varying distances from the source of the acoustic signal.

The propagation velocity of acoustic tube waves in a wellbore is determined primarily by the acoustic velocity in the wellbore, especially at a frequency sufficiently low that the ratio of acoustic wavelength to conduit diameter (e.g., tubing diameter, casing diameter, wellbore diameter, as the case may be) is substantially greater than one. The measurement of the velocity of the acoustic tube waves at low frequency thus provides a measure of sound velocity in the fluid within the conduit and therefore, with certain constraints, of the fluid composition. For example, if a hydrocarbon well is known (e.g., such as from surface measurements) to be producing a mixture of water and oil, the measurement of acoustic wave velocity as a function of location along the well will allow the water/oil ratio to be determined as a function of well depth (knowing the acoustic velocity in oil and water). In turn, this provides the production engineer with the knowledge of where the water is entering the well, which can be used to optimize the well performance.

With this knowledge, remedial actions, such as preventing production from water-producing zones, or reducing the flow rate to avoid coning, or controlling the injection profile that supports the production, may be employed to produce oil preferentially to water. Relationships between "$\lambda/D$" (i.e., the ratio of the acoustic wavelength to the conduit inner diameter) and "$v/c$" (i.e., the ratio of the phase velocity of the acoustic wave to that of sound in the bulk fluid within the wellbore) may be known and tend to a constant value (dependent on the densities of the fluid and the conduit wall and the acoustic velocity in the fluid, and the shear wave velocity in the conduit wall) at low frequency.

However, other waves, relating to the propagation of shear waves and compressional waves in the wall of the structure 124 and in the medium surrounding the structure 124 are also propagated as higher order modes of the acoustic waveguide. In certain types of completions, these waves may be detected using a distributed acoustic sensor. These waves can provide information on the formation properties.

Another application of the techniques described here is to monitor a variety of chemical reactions in the wellbore 106. For example, a sensor straddling the region where cement is setting may determine a change in the acoustic transmission caused by the setting of the cement. In addition, where the acoustic pulses are transmitted from the surface, the nature of the reflection from the cement/well fluid interface will change as the cement cures.

The same approach can be used to detect the solidification of the fluid in a pipe, such as waxing or hydrate formation in subsea pipelines, or the solidification of fluids transported in surface pipelines, such as sulfur or plastics.

The techniques described herein may also be used to detect mud pulse telemetry signals from a remote downhole drilling and MWD/LWD ("measurement-while-drilling/logging-while-drilling") tool. In general, the mud pulse signals are degraded by transmission through the wellbore and suffer from reflections at interfaces in pipe size, as well as from the effects of surface noise (mud pumps and other machinery on the rig floor). Thus, in such embodiments, the fiber sensing cable 102 may be cemented behind the upper section of the casing 104, or attached to a drilling riser in a subsea well application and used to detect the acoustic waves traveling towards the surface, or lowered into the wellbore during drilling operations and used to detect mud-pulse signals from a remote tool which acts as the acoustic source. In such mud-pulse telemetry applications, the techniques described herein may improve the mud pulse signals not only by detecting the signals closer to their source, but also by enabling the entire data set obtained from the measurement to be processed coherently. As a result, signals traveling in each direction may be separated and summed, thus providing a signal processing gain of signal strength, while also allowing for rejection of waves traveling in the opposite direction. For instance, the deployment of a distributed acoustic sensor in such applications will allow for discrimination of noise from surface machinery, pumps, etc.

The techniques described herein also may be particularly useful in monitoring acoustic waves in zones that are hydraulically isolated from the shallow parts of the well, e.g. in zones beneath a packer or bridge-plug.

While the invention has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. An acoustic wave detection apparatus comprising:
a fiber optic cable disposed along an elongate structure and configured to react to pressure changes resulting from a guided acoustic wave propagating along the elongate structure;
an optical source to launch an optical pulse into the fiber optic cable; and
a data acquisition system coupled to the fiber optic cable to detect coherent Rayleigh noise (CRN) produced in response to the optical pulse and to track propagation of the guided acoustic wave along the elongate structure based on the detected CRN, and where the data acquisition system is further configured to determine a location of the guided acoustic wave along the elongate structure based on the detected CRN.

2. The apparatus of claim 1, wherein the data acquisition system is further configured to determine a velocity of the guided acoustic wave as it propagates along the structure based on the detected CRN.

3. The apparatus of claim 1, wherein the data acquisition system is further configured to determine an attenuation of the guided acoustic wave based on the detected CRN, wherein the attenuation is indicate of characteristics of a medium surrounding the elongate structure.

4. The apparatus of claim 1, wherein the fiber optic cable comprises an array of discrete optical sensors.

5. The apparatus of claim 1, wherein the optical source is configured to launch a plurality of optical pulses at a plurality of optical frequencies.

6. The apparatus of claim 1, further comprising an acoustic source to generate the guided acoustic wave.

7. The apparatus of claim 6, wherein the acoustic source comprises a measurement while drilling (MWD) tool deployed in a wellbore.

8. The apparatus of claim 6, wherein the acoustic source is configured to generate a plurality of narrowband acoustic pulses at different carrier frequencies.

9. The apparatus of claim 1, wherein the elongate structure comprises a wellbore.

10. The apparatus of claim 1, wherein the elongate structure comprises a production tubing disposed in a wellbore.

11. A method for detecting acoustic wave propagation comprising:
launching an optical signal into a fiber optic cable disposed along an elongate structure;
generating a guided acoustic wave that propagates along the elongate structure; and
analyzing a coherent Rayleigh noise (CRN) signal produced in response to the optical signal to track propagation of the guided acoustic wave along the elongate structure, wherein analyzing the CRN signal further comprises determining a location of the guided acoustic wave along the elongate structure.

12. The method of claim 11, wherein analyzing the CRN signal further comprises determining a velocity of the guided acoustic wave along the elongate structure.

13. The method of claim 11, wherein analyzing the CRN signal further comprises determining an attenuation of the guided acoustic wave, wherein the attenuation is indicate of a characteristic of a medium surrounding the elongate structure.

14. The method of claim 11, wherein generating the guided acoustic wave comprises generating a plurality of acoustic pulses at different carrier frequencies.

15. The method of claim 11, wherein generating the guided acoustic wave comprises deploying a measurement while drilling (MWD) tool into a wellbore.

16. The method of claim 11, wherein the elongate structure comprises a wellbore.

17. A system comprising:
an optical fiber for deployment in a wellbore;
an acoustic source to generate a guided acoustic wave to propagate along the wellbore;
an optical source to launch an optical signal into the optical fiber to produce a backscattered signal while the guided acoustic wave is propagating along the wellbore;
a receiver to detect coherent Rayleigh noise (CRN) in the backscattered signal
a processing circuit to process the CRN to monitor propagation of the acoustic wave along the wellbore, wherein the processing circuit is configured to process the CRN to determine a location of the guided acoustic wave.

18. The system of claim 17, wherein the optical fiber is disposed outside a well casing disposed in the wellbore.

19. The system of claim 18, wherein the optical fiber is coupled to an outer surface of the well casing.

20. The system of claim 17, wherein the processing circuit is configured to process the CRN to determine a velocity of the guided acoustic wave.

21. The system of claim 17, wherein the processing circuit is configured to process the CRN to determine an attenuation of the guided acoustic wave, wherein the attenuation is indicative of a characteristic of a medium surrounding the wellbore.

* * * * *